United States Patent [19]
Roberts

[11] 4,032,049
[45] June 28, 1977

[54] FOOD PRODUCT STUFFING PUMP WITH VACUUM LINE

[75] Inventor: Gary F. Roberts, East Moline, Ill.

[73] Assignee: The Kartridg Pak Co., Davenport, Iowa

[22] Filed: Aug. 18, 1975

[21] Appl. No.: 605,609

[52] U.S. Cl. .................................. 222/238; 17/35; 17/40; 222/252; 222/334

[51] Int. Cl.² ................... A22C 11/08; G01F 11/20

[58] Field of Search .......... 222/236, 238, 251, 252, 222/255, 412, 413, 334; 17/35, 40; 418/201, 202

[56] References Cited
UNITED STATES PATENTS

| | | | |
|---|---|---|---|
| 1,319,776 | 10/1919 | Kerr | 418/202 X |
| 2,373,865 | 4/1945 | Walter | 17/40 X |
| 3,159,315 | 12/1964 | Friesen | 222/252 |
| 3,311,291 | 3/1967 | Surdy | 418/201 X |
| 3,377,000 | 4/1968 | Mason, Jr. | 222/412 X |
| 3,879,150 | 4/1975 | Brown et al. | 272/238 X |

Primary Examiner—Robert B. Reeves
Assistant Examiner—David A. Scherbel
Attorney, Agent, or Firm—Lockwood, Dewey, Zickert & Alex

[57] ABSTRACT

A stuffing pump for handling a food product having a helical gear metering pump with means for removing air from the material moving through the metering pump and a feed conveyor in a hopper continuously feeding material to the metering pump. The feed conveyer includes a pair of counter-rotating augers in the bottom of the hopper. Independent and infinitely variable drive mechanisms are provided for the metering pump and the feed conveyer.

14 Claims, 18 Drawing Figures

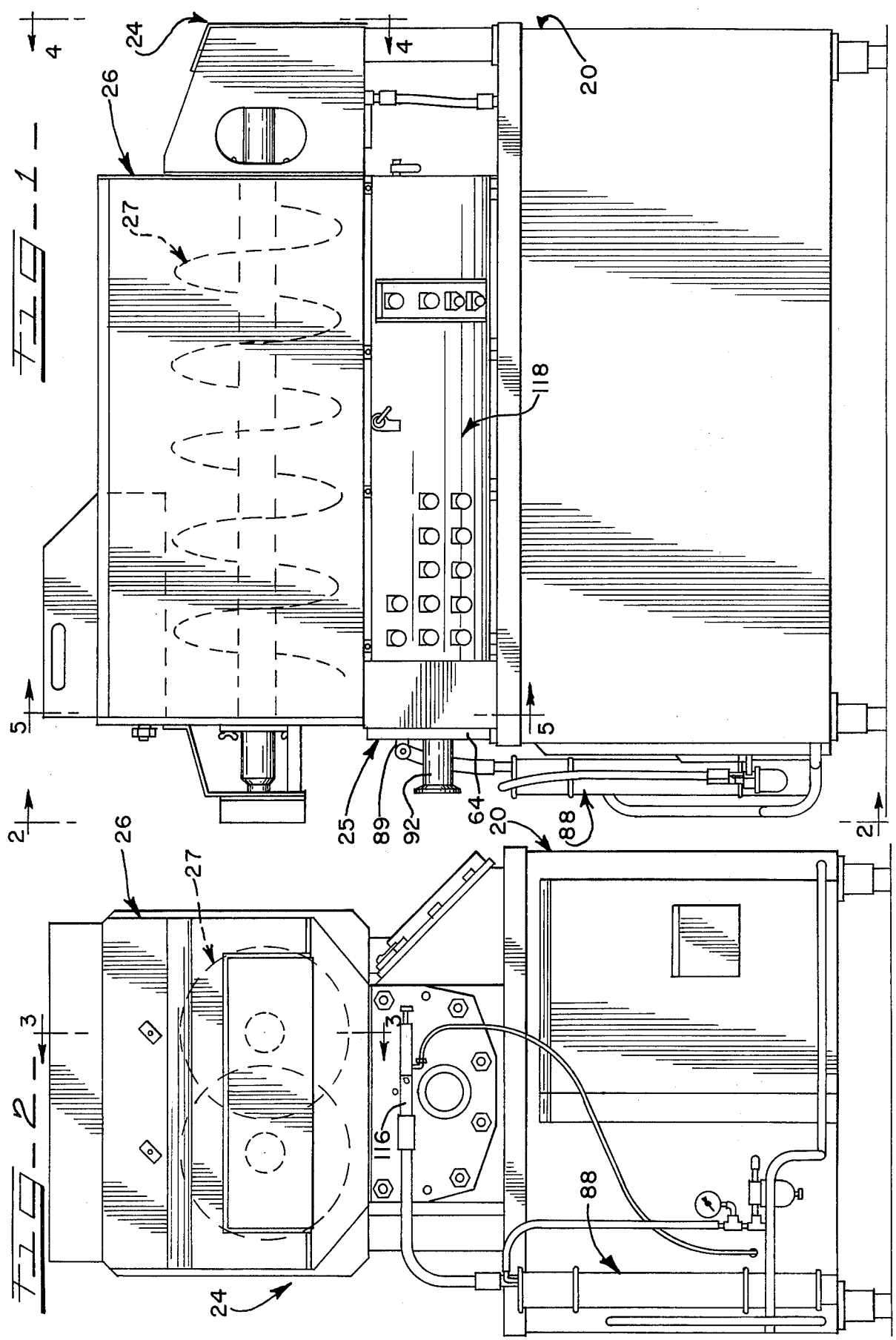

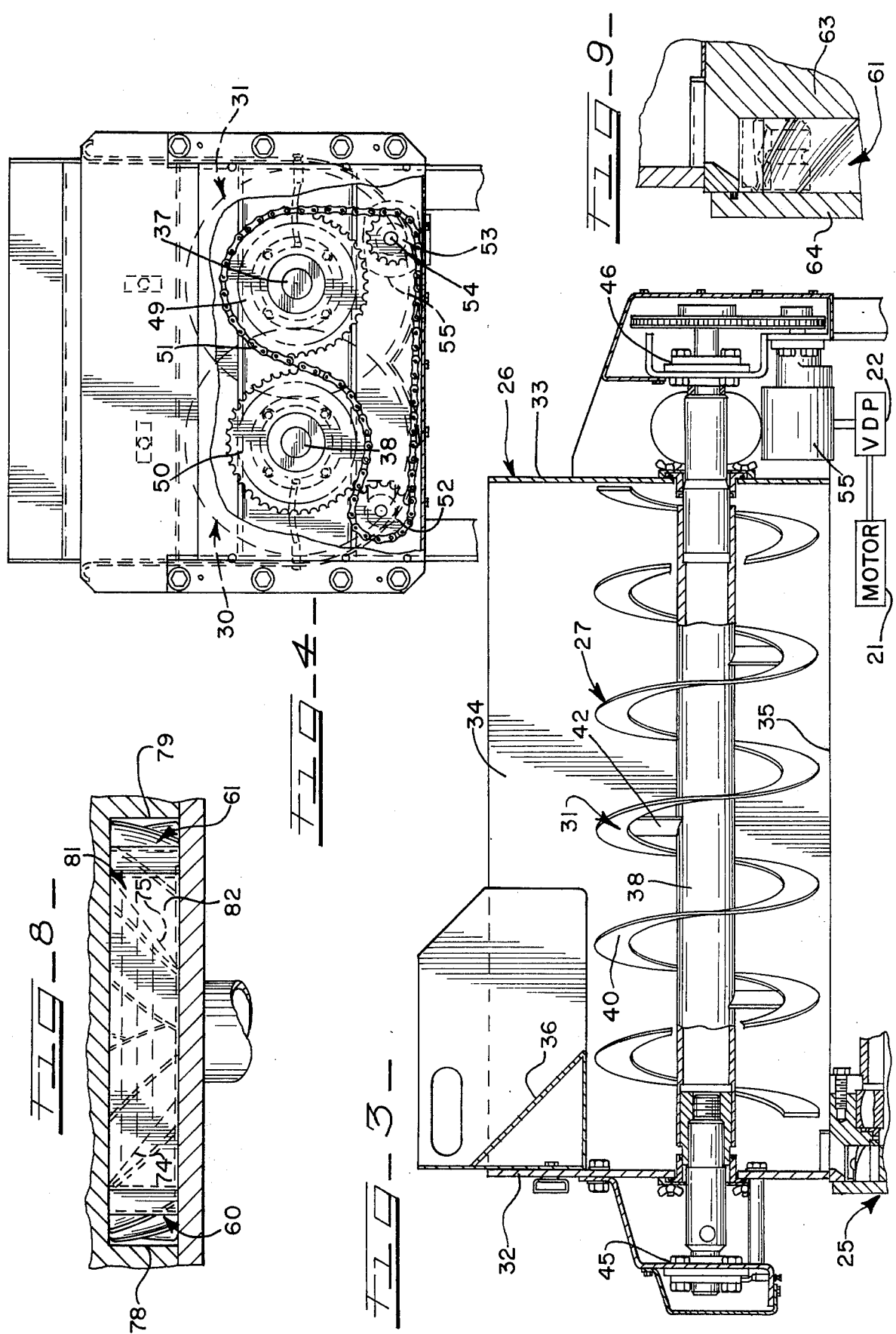

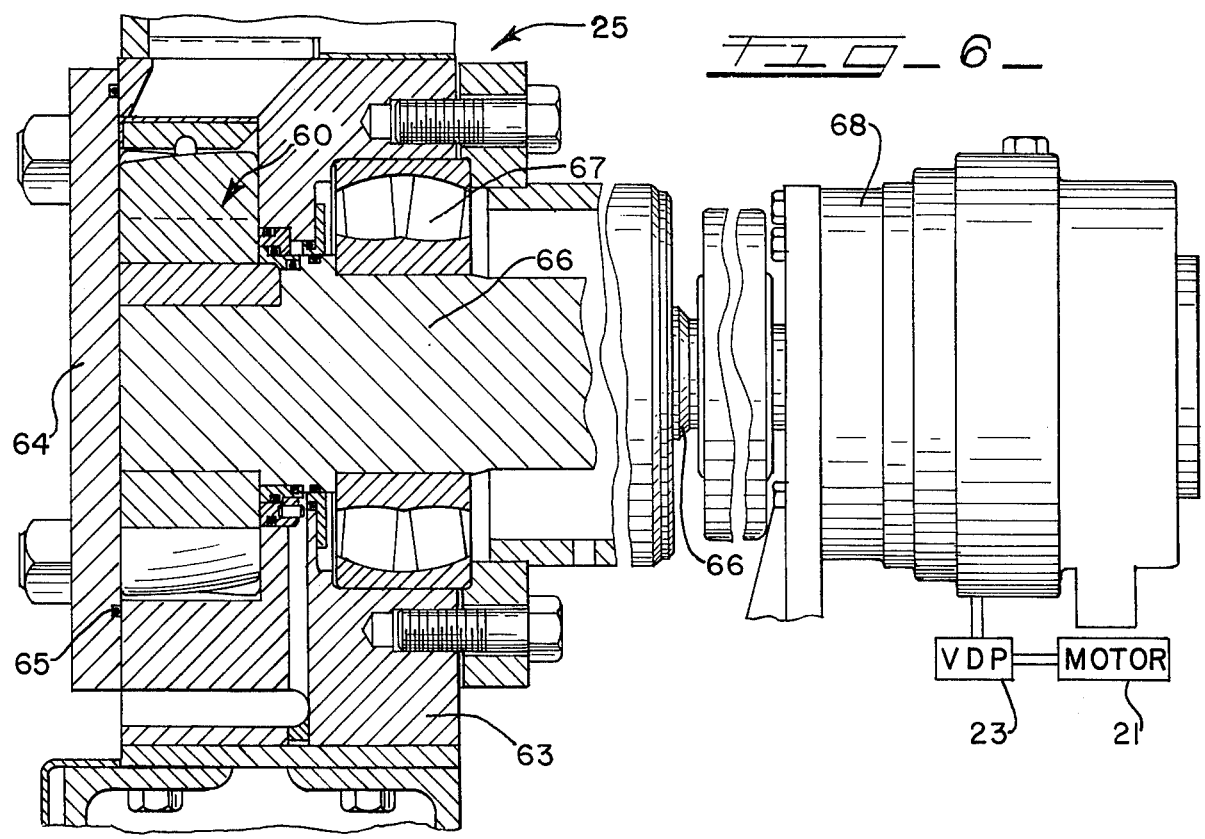
FIG_6_
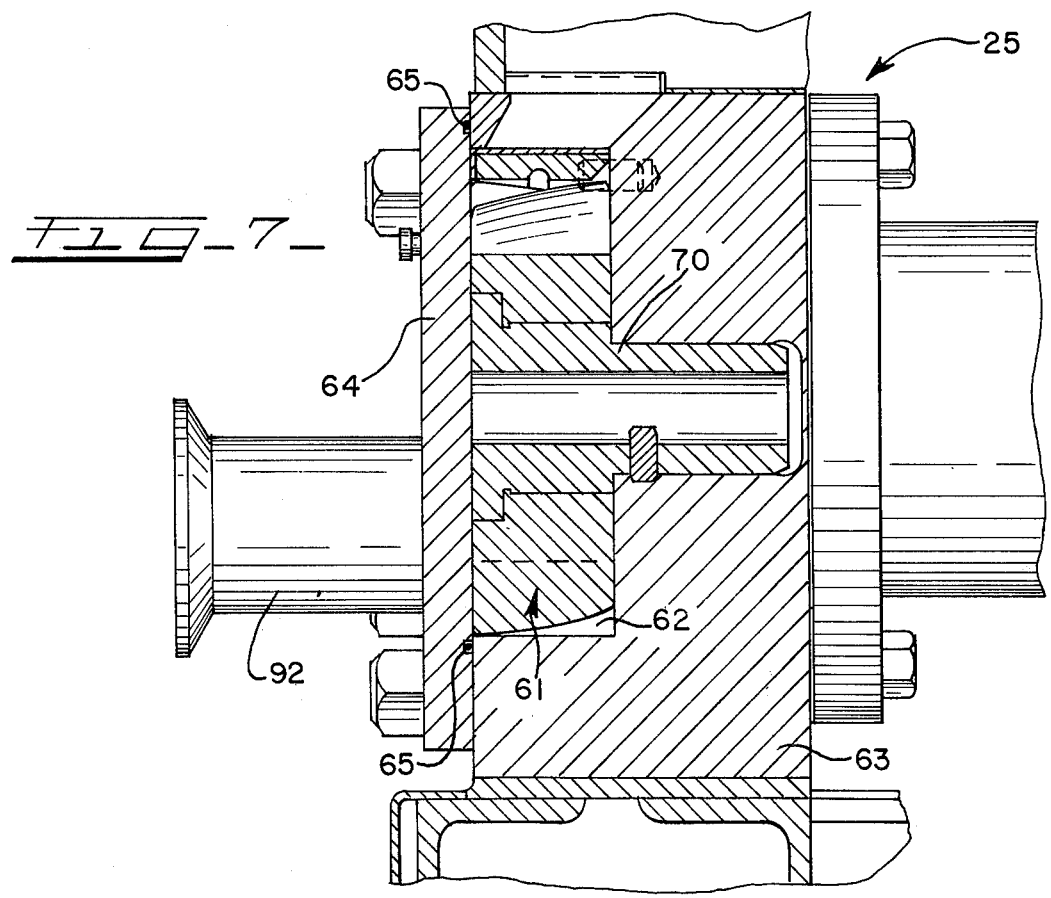
FIG_7_

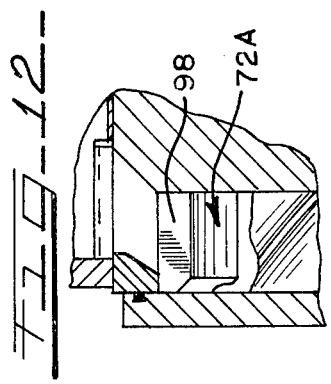
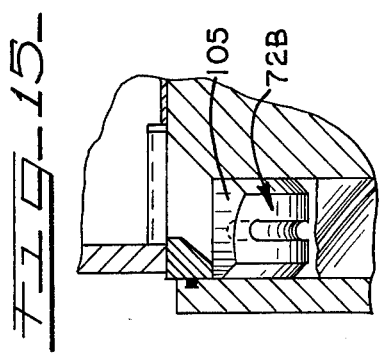
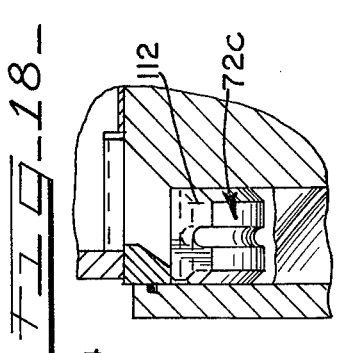
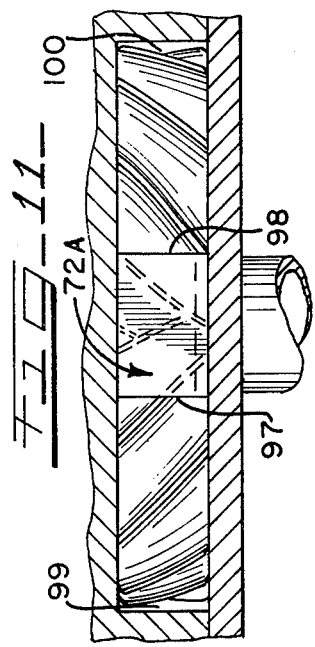
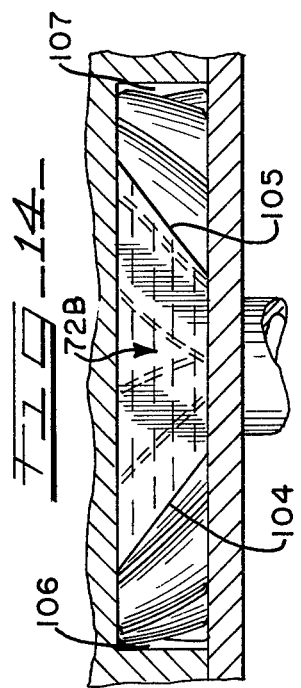
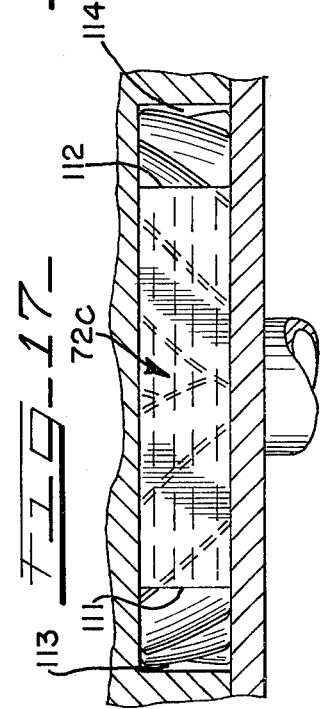
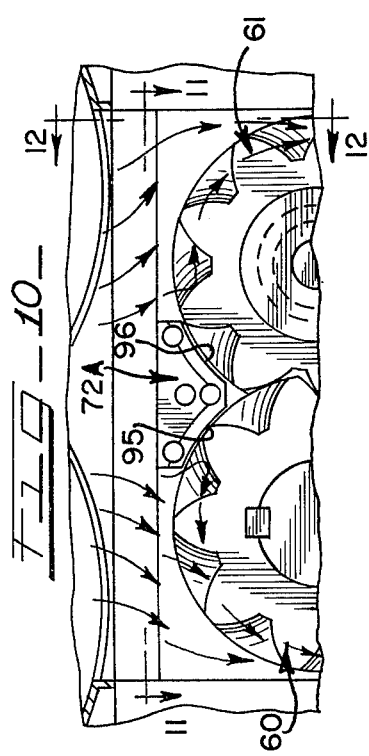
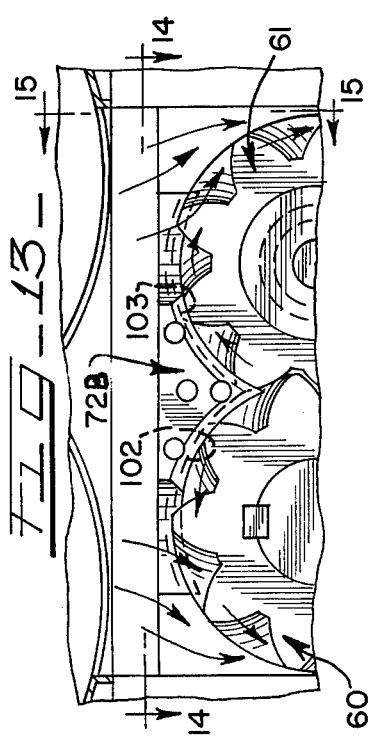
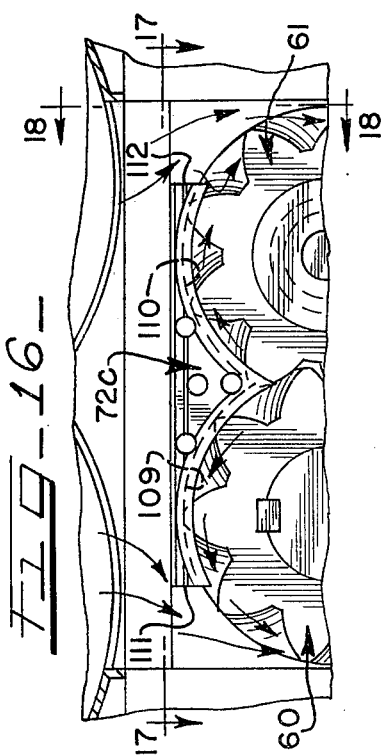

FOOD PRODUCT STUFFING PUMP WITH VACUUM LINE

This invention relates in general to a pump for handling food products, and more particularly, to a pump for stuffing food products into casings for packaging purposes.

The stuffing pump of the invention is capable of handling ground meat and semi-fluid food products where it is desirable to package such products in suitable casings. It therefore will be appreciated that the stuffing pump of the invention is suitable for pumping sausage batter and the like into sausage casings. More specifically, the pump of the present invention can handle a variety of products because of its uniqueness, such as ground meat products in the form of salami, finely chopped products in the form of bologna, very coarse ground products in the form of beef, or semi-fluid products in the form of cheese spread.

Heretofore, it has been well known to utilize stuffing pumps for stuffing food products into casings, such as shown in U.S. Pat. Nos. 2,889,574 and 2,966,698. It has also been known to utilize gear pumps in stuffing pump apparatus, and to de-aerate meat products handled by gear pumps, such as shown in U.S. Pat. No. 3,147,784.

The present invention includes a helical gear metering pump driven at an infinitely variable speed with means for removing air from the pumped material as the material is introduced into the cavities of the metering gears. Material to be handled by the metering pump is supplied by a hopper arranged above the metering pump and in which is provided a pair of intermeshing counter-rotating conveying augers driven independently of the metering pump and feeding an overabundance of material to the metering pump. Accordingly, the counter-rotating augers operate as a feed conveyer in the hopper for supercharging material to the metering pump. The augers knead air or gas out of the product in the hopper before feeding it to the metering gear pump inlet. By driving the augers at a speed faster than necessary to supply the metering pump with products, the augers provide both a kneading and cramming action. Many products, such as coarse ground beef, resist flowing into small space and must be crammed in. The ability to vary the speed ratio of the auger conveyer and the helical gear metering pump facilitate the handling of various products, as it is important to run the conveyer and pump at a speed ratio which will produce efficient product flow.

Accordingly, it is an object of the present invention to provide a new and improved food product stuffing pump capable of efficiently handling a wide range of food products in the chopped, ground or semi-fluid state.

It is a further object of the present invention to provide a food product stuffing pump including a helical gear metering pump with means for de-aerating the product, a hopper for containing a supply of food product to be delivered to the metering pump and an auger conveyer in the hopper for overcharging the metering pump with the food product to be pumped.

It is a still further object of the present invention to provide a food product stuffing pump including a helical gear metering pump and an auger conveyer for feeding material to the metering pump and wherein independently driven power means are provided for each of the conveyer and the pump so that the speed ratio between the conveyer and the pump may be adjusted to provide the most efficient handling of a particular food product.

Another object of the present invention is the provision of a food product stuffing pump including a helical gear metering pump and a hopper having an auger conveyer in the bottom feeding material to the metering pump wherein separate drive means are provided for the metering pump and the auger conveyor so that the speed ratio between the auger conveyor and the metering pump is infinitely variable, thereby rendering the stuffing pump suitable for handling various food products.

Other objects, features and advantages of the invention will be apparent from the following detailed disclosure, taken in conjunction with the accompanying sheets of drawings, wherein like reference numerals refer to like parts, in which:

FIG. 1. is a longitudinal elevational view of the food stuffing pump according to the invention and showing in dotted lines the auger placement in the hopper;

FIG. 2 is an end elevational view of the food stuffing pump according to the invention and taken generally along line 2—2 of FIG. 1;

FIG. 3. is an enlarged detail sectional view of the auger conveyor showing one auger in elevation with some parts broken away and other parts in section, and taken substantially along line 3—3 of FIG. 2;

FIG. 4 is an enlarged sectional view taken substantially along line 4—4 of FIG. 1 and showing the drive arrangement for the auger conveyer;

FIG. 6 is a greatly enlarged broken elevational sectional view taken through one of the helical gears of the metering pump substantially along line 6—6 of FIG. 5 with some parts in section and other parts shown in elevational and block form;

FIG. 7 is a greatly enlarged sectional view of the other part of the metering pump taken substantially along line 7—7 of FIG. 5;

FIG. 8 is a sectional view taken horizontally through the upper part of the metering pump and substantially along line 8—8 of FIG. 5;

FIG. 9 is a fragmentary detail sectional view taken substantially along line 9—9 of FIG. 5;

FIG. 10 is a fragmentary detail sectional view taken through the metering pump like FIG. 5 and illustrating the stub wedge used for handling of very coarse ground products such as beef;

FIG. 11 is a detailed horizontal sectional view taken substantially along the line 11—11 of FIG. 10;

FIG. 12 is a fragmentary detailed vertical sectional view taken substantially along line 12—12 of FIG. 10;

FIG. 13 is a view similar to FIG. 10 but showing another form of wedge used with the metering pump and particularly one used for ground products such as salami;

FIG. 14 is a detailed horizontal sectional view taken substantially along line 14—14 of FIG. 13;

FIG. 15 is a fragmentary detailed vertical sectional view taken substantially along line 15—15 of FIG. 13;

FIG. 16 is a view similar to FIGS. 10 and 13 and showing another form of wedge used for handling still a further product and particularly a finely chopped product such as bologna;

FIG. 17 is a detailed horizontal sectional view taken substantially along line 17—17 of FIG. 16; and FIG. 18 is a fragmentary detailed vertical sectional view taken substantially along line 18—18 of FIG. 16.

Figure 5:
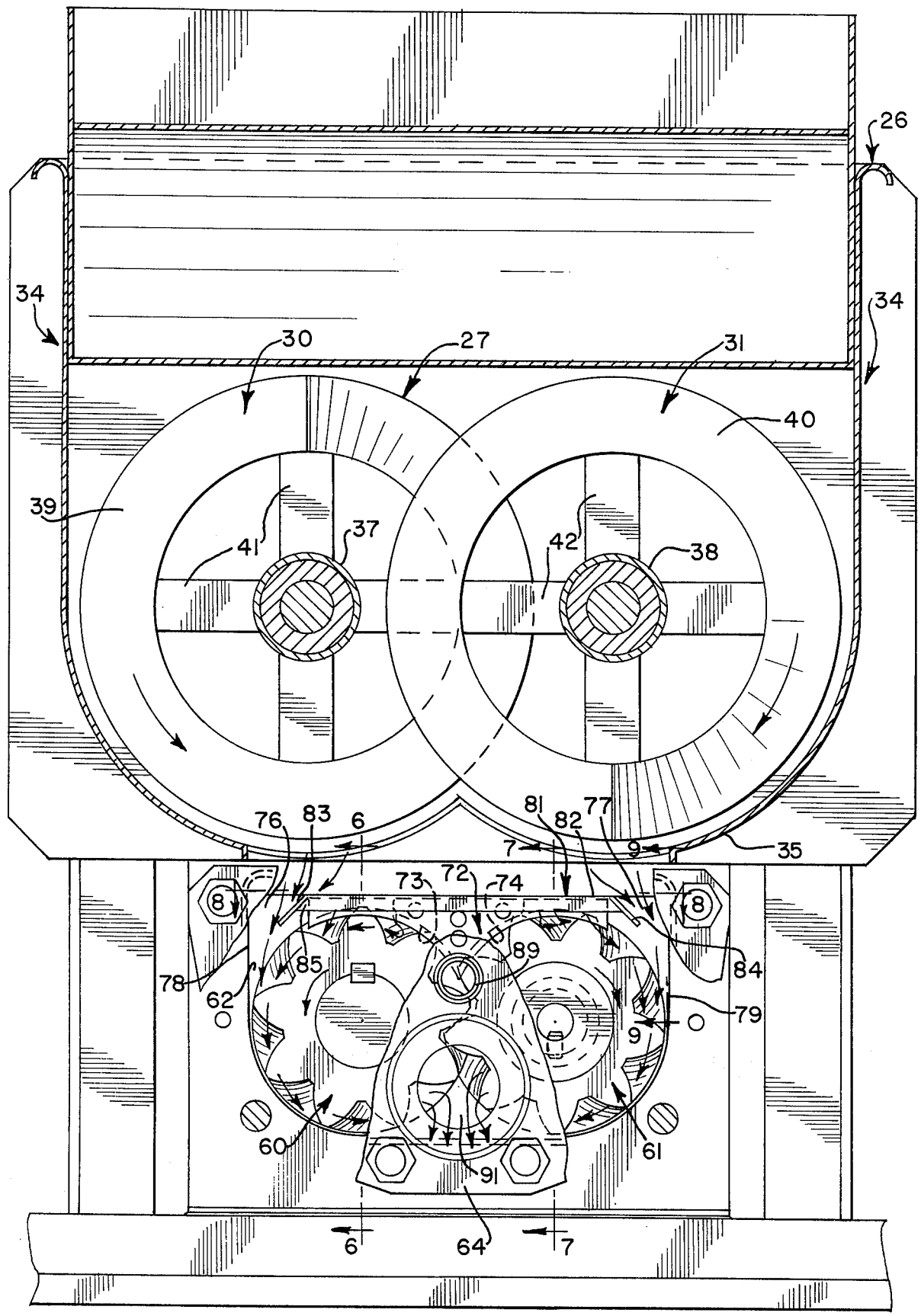
FIG. 5 is a greatly enlarged sectional view taken substantially along line 5—5 of FIG. 1 showing the interrelationship between the auger conveyor and the metering pump.

The stuffing pump of the present invention is particularly unique in that it includes an auger conveyer coacting with a helical gear metering pump for handling various food products and for producing a de-aerated food product. More specifically, the auger conveyor functions to knead air out of the product before supplying the product to the metering pump.

The helical gear metering pump is hydraulically driven at an infinitely variable speed. Similarly, the auger conveyer is hydraulically driven at an infinitely variable speed. Accordingly, the speed ratio between the metering pump and the auger conveyer can be adjusted to provide the desired working action between the conveyer and the pump. It is preferable that the conveying rate of the auger conveyer relates to the pumping rate of the metering pump such as to oversupply or supercharge the metering pump with the product. The infinitely variable speed ratio between the hopper conveying augers and the metering gears in the metering pump accommodates the slippage and feeding efficiency differences with the different products.

The helical metering gears of the metering pump are provided with a steep 45 degree helix angle, whereby the material in the gear tooth spaces is squeezed along the line of the tooth spaces and discharged out the end of the spaces as the mating teeth roll down the spaces from the opposite ends, thereby minimizing smearing of product and crushing of the product. Inasmuch as many products such as coarse ground beef are resistant to flowing into small spaces, such as the bottoms of the gear tooth spaces, and must be crammed in, the auger conveyer may be run at a speed faster than that required to maintain an adequate supply of product to the metering pump, to thereby provide both kneading and cramming actions.

A source of vacuum is connected to the cavities of the helical gears in the metering pump to assist in removal of air from the material being pumped by the metering pump. Accordingly, a product more free of air may be produced by the stuffing pump of the present invention.

Referring now to the present invention, and particularly to FIGS. 1 and 2, it is seen the stuffing pump according to the present invention includes generally the lower housing 20 within which may be located necessary power producing components including an electric motor driving a pair of variable displacement hydraulic pumps, wherein one pump operates a hydraulic motor for driving the metering pump and the other pump operates a motor for driving the auger conveyer. The motor is shown in block form in FIGS. 3 and 6 and identified by the numeral 21, while the variable displacement pumps are also shown in FIGS. 3 and 6 in block form and identified by the numerals 22 and 23, wherein the pump 22 supplies power for the auger conveyer and the pump 23 supplies power for the metering pump. The upper structure of the stuffing pump mounted on the lower housing 20 is generally indicated by the numeral 24. The upper structure 24 includes generally a metering pump 25, a hopper 26 for receiving a supply of food product and within which is located an auger conveyer 27.

As seen particularly in FIGS. 3 and 5, it may be appreciated the hopper 26 is box-shaped and elongated within which the auger conveyor 27 is located. The auger conveyer 27 includes a pair of counter-rotating augers 30 and 31 arranged together in intermeshing relationship. The hopper 26 includes front and back end walls 32 and 33 and opposed side walls 34, 34, together with a bottom wall 35 arcuately formed to mate with the shape of the augers, as particularly seen in FIG. 5. A transversely extending deflecting panel 36 is arranged adjacent the front end wall 32 so that product introduced into the hopper will be generally directed toward the pump inlet by the auger conveyer and not allowed to rise upward and spill over the hopper end wall 32.

The conveying augers 31 and 32 respectively include parallel spaced and coplanar arranged shafts 37 and 38 and ribbon helices 39 and 40 supported on the shafts by means of a plurality of spokes 41 and 42. It should be here appreciated that full helices could be provided on the shaft in place of the ribbon helices and spokes. The shafts are bearingly mounted at opposite ends in the front and back end walls 32 and 33 of the hopper, as shown by the auger 31 in FIG. 3. In reality, the bearing mounts are spaced from the end walls wherein the front or forward end of each shaft is bearingly mounted at 45, while the rear end of each shaft is bearingly mounted at 46. At the rearmost end of these shafts, chain sprockets 49 and 50 are mounted over which is trained an endless chain 51. The chain 51 is further trained over idler take-up sprocket 52 and a drive sprocket 53. The drive sprocket is mounted on a shaft 54 of a hydraulic motor 55, which is supplied with power by means of a variable displacement pump 22 that is driven by the electric motor 21. Inasmuch as the pump 22 can be adjusted to provide whatever output desired for driving the pump 55, the speed of the auger conveyer is infinitely variable. It should be appreciated at this point that the drive for the auger conveyer is completely independent and does not provide any power for the metering pump.

The metering pump 25 is also located in the upper structure 24 of the stuffing pump and at the delivery end of the auger conveyor or at the front part of the machine, as seen particularly in FIGS. 1 and 3. Accordingly, the auger conveyer is located above the metering pump and functions to force material toward the front end wall 32 which is at the metering pump area.

The relationship between the auger conveyer 27 arranged within the hopper 26 and the metering pump 25 is best illustrated in FIGS. 3 and 5, while details of the metering pump are further shown in FIGS. 6 and 7. The metering pump includes a pair of intermeshing helical gears 60 and 61 operating within a cavity 62 formed in a housing 63. The cavity is closed by means of a front cover 64 which is suitably fastened to the housing 63. An O-ring seal 65 is mounted between the cover and the housing. The cavity 62 is contoured with respect to the helical gears and the gears are rotated, as indicated by the arrows in FIG. 5, so that the upper sides of the gears function as the inlet to the pump, while the lower sides of the gears function as the outlet.

Power is supplied to helical gear 60 which in turn drives the helical gear 61. As seen in FIG. 6, the helical gear 60 is mounted on a shaft 66 supported by a bearing 67 carried in the housing 63 of the pump. The shaft 66 is connected to a hydraulic motor 68 which is driven by the variable displacement pump 23 that is in turn driven by the electric motor 21. The variable displacement pump 23 can be adjusted to provide infinite output to thereby define an infinitely variable speed for the hydraulic motor 68. Accordingly, the metering pump 25 is independently driven at an infinitely variable speed, while the electric motor 21 is common to the variable displacement pumps 22 and 23. The speed ratio between the metering pump driven by the variable displacement pump 23 and the auger conveyer driven by the variable displacement pump 22 can be variably changed in order to provide the best possible speed ratio for handling a particular food product.

The driven helical gear 61 is supported on a stub shaft 70 that is journaled in the housing 63, as seen particularly in FIG. 7. Accordingly, the helical gears function together during the pumping of material between the inlet and outlet.

Inasmuch as the metering pump may be most efficient by adjustment of the inlet according to the type of food product being pumped, a plurality of inlet structures are illustrated to emphasize the versatility of the pump. For example, the inlet structure illustrated in FIGS. 5 and 9 is especially suitable for semi-fluid food products, such as a cheese spread. The inlet structure includes a wedge 72 having lower contour faces 73 and 74 mating with the outer peripheral contour of the gears 60 and 61 respectively and extending over the gears such that the faces terminate beyond the top dead-center points of the gears, as seen particularly in FIG. 5. Looking at the wedge in plan view, as shown in FIG. 8, the wedge is somewhat V-shaped where generally vertically extending faces 74 and 75 coact with the overall upper opening to the cavity 62 to define dual inlets 76 and 77, both of which are arranged at the outer side walls 78 and 79 of the cavity 62. Accordingly, dual inlet passages are provided for the helical gears.

Also illustrated in FIGS. 5 to 9 is a baffle 81 that may be optionally used in cooperation with the wedge 72 in order to further restrict the size of the inlet passages. The baffle 81 includes an elongated horizontally extending panel 82 filling the width of the opening to the gear cavity and extending, as seen in FIGS. 5 and 8, to a point short of the side walls 78 and 79. Downwardly inclined lips 83 and 84 are provided at the opposite ends of the panel 82 and which extend beyond the ends of the wedge 72. Accordingly, it may be appreciated the horizontal panel 82 is of a length substantially equal to the horizontal length of the wedge 72. A vertically downwardly extending flange 85 is provided at the front edge of the horizontal panel 82 and extends to the lips 83 and 84. As seen particularly in FIG. 5, the lips are in spaced relation to the outer peripheries of the helical gears 60 and 61, and the free ends of the lips coact with the side walls 78 and 79 to define the inlet passages to the metering pump. The baffle assists deaeration of the food product by partially masking the metering gears from the product flow, thereby forming a vacuum pocket between the lips 83, 84 and the respective metering gears adjacent a thinly extruded layer of food product which enters the cavity of the gears. This vacuum pocket provides an expansion area for entrapped air or gas. Accordingly, the baffle 81 is optional as used in connection with a wedge.

It is an important feature of the invention to remove air or gas from the product prior to feeding the product to packaging casings. While kneading of the food product in the hopper by the action of the auger conveyers does accomplish removal of air or gas, further air or gas is removed as the product is pumped through the metering pump. In this respect, air or gas is removed from the pumped material by use of a vacuum pump 88, which produces a source of vacuum that is communicated to a vacuum port 89 formed in the pump cover plate 64, as seen in FIG. 5. The wedge 72 masks the vacuum port 89 from the product flow. As seen by the arrows in FIG. 5, the flow of product is to the outer peripheries of the helical gears at the side walls 78 and 79 and to the bight portion of the gears at the lower side which communicates with the single outlet 91. The outlet port 91 has attached thereto a suitable stuffing horn 92 which will communicate to the casings to be packaged.

As particularly seen in FIG. 8, the helical gears 60 and 61 include gear teeth having about a 45 degree helix angle. It can be appreciated that the metering gear thickness and tooth size could be varied. Further, the helix angle is steep wherein the material in the gear tooth spaces is squeezed along the length of the gear tooth spaces and discharged out the end of the spaces as the mating tooth rolls down the space at the opposite end. This action minimizes the crushing of the food product. The metering gears, like the conveying augers, counter-rotate, as indicated by the arrows on the augers and gears in FIG. 5.

As above stated, the wedge 72 shown in FIG. 5 masks the vacuum port from the product flow and also defines the dual inlet passages to the metering pump. This wedge may be made of any suitable material. For example, it may be molded of a plastic material, such as Delrin. For certain food products, it is advantageous to use certain wedge structures. Other wedge structures are illustrated in FIGS. 10 to 18 for use with food products other than semi-fluid products for which the wedge 72 is especially useful.

The wedge shown in FIGS. 10 to 12 and generally indicated by the numeral 72A is defined as a stub wedge having faces 95 and 96 mating with the outer contours of the helical metering gears 60 and 61 respectively. The opposite ends of the wedge are square to define square faces 97 and 98 and terminate short of the top dead-center points of the metering gears. Accordingly, relatively large dual inlet passages 99 and 100 are defined. This wedge is especially useful for very coarse ground products, such as ground beef.

The wedge 72B shown in FIGS. 13 to 15 is referred to as a "V-floating" wedge and is especially suitable for use with ground products such as salami. This wedge has a configuration similar to the wedge 72 in that it is provided with arcuate faces 102 and 103 mating with the outer contours of the metering gears 60 and 61, together with vertical end faces 104 and 105 inclined relative the rotation axes of the gears which coact to define the inlet passages 106 and 107. It will be noted that the inclined faces 104 and 105 more or less mate or align with the helix angle of the teeth of the metering gears.

The wedge 72C illustrated in FIGS. 16 to 18 differs from the wedges 72 and 72B primarily in that the faces are square. Again, the wedge 72C includes arcuate faces 109 and 110 mating with the outer contours of the metering gears. Vertically arranged end faces 111 and 112 are square and therefore extend parallel to the rotational axis of the metering gears to define rectangular or square inlet passages 113 and 114. This wedge is especially useful for finely chopped products such as bologna. As above explained, the baffle 81 may be used with certain wedges, and it could be used with wedge 72C when it is most important that as many very small air bubbles as possible be removed from the product. The machine is then run very slowly. Such a product might be bologna which is to be converted to thin slices before sale.

It can now be appreciated the stuffing pump according to the present invention may be structured to handle various types of food products. The wedge utilized with the metering gears in the metering pump may be easily exchanged to provide the most efficient type of wedge of a particular product. A three-way valve structure 116 is provided on the vacuum supply line so that the vacuum port may be vented to atmosphere and the vacuum source sealed off when the metering gears are not running. A control panel 118 is provided with the necessary number of control members for obtaining the desired operation of the stuffing pump. In operation, the desired speed ratio between the auger conveyer 27 and the metering pump 25 is established by manipulation of the controls in accordance with the type of food product being handled. It may be appreciated that the slippage and feeding efficiency of the augers will change for different products. For example, some products tend to partially clog the augers, while other products tend to stick to the augers and turn with them during operation of the auger conveyer. The effective pitch and size of the hopper conveying augers can be varied and compensated for by changing the speed at which the augers are driven. Accordingly, it is necessary to substitute augers during the handling of various food products. The speed ratio of the auger conveyor and the metering pump is regulated so that an overabundance of food product is delivered by the auger conveyer to the metering pump. This assures efficient and accurate metering capability for the metering pump. Since the drives for the auger conveyor and metering pump are independent, it can be appreciated that the speed ratio can be adjusted as needed for the particular food product being handled. Accordingly, the stuffing pump of the present invention has such flexibility that it can be used for pumping of a great number of different products.

It will be understood that modifications and variations may be effected without departing from the scope of the novel concepts of the present invention, but it is understood that this application is to be limited only by the scope of the appended claims.

The invention is hereby claimed as follows:

1. A stuffing pump for handling a food product comprising a helical gear metering pump having a single outlet passage and dual inlet passages, first means for driving said metering pump at variable speed; vacuum means connected to the metering pump to remove air from the food product, an elongated hopper above the metering pump for receiving food product, a feed conveyer in the bottom of the hopper feeding food product to the inlet passages of the metering pump at a rate faster than the intake capacity of said metering pump, and second means for driving said conveyer at variable speed.

2. The stuffing pump as defined in claim 1, wherein said gear pump includes a pair of intermeshing helical gears having a relatively steep helix angle.

3. The stuffing pump as defined in claim 2, wherein the helix angle is about 45°.

4. The stuffing pump as defined in claim 2, wherein the feed conveyer includes a pair of counter-rotating and intermeshing augers.

5. The stuffing pump as defined in claim 4, wherein each of said first and second driving means includes a hydraulic motor powered by a variable displacement hydraulic pump.

6. The stuffing pump as defined in claim 2, wherein said helical gears are rotatably mounted in a housing, and a wedge is mounted in the housing in association with the gears to define the dual inlet openings.

7. The stuffing pump as defined in claim 6, wherein the wedge includes square ends and is stub-shaped to define relatively large inlet passages.

8. The stuffing pump as defined in claim 6, wherein the wedge includes square ends and is elongated to define relatively small inlet passages.

9. The stuffing pump as defined in claim 6, wherein the wedge includes inclined ends.

10. The stuffing pump as defined in claim 6, wherein a baffle is provided over the wedge to restrict the size of the inlet passages and to form a vacuum pocket adjacent each gear to define an expansion area for air.

11. The stuffing pump as defined in claim 1, wherein the feed conveyer includes a pair of counter-rotating and intermeshing augers.

12. The stuffing pump as defined in claim 11, wherein said augers extend horizontally in said hopper.

13. The stuffing pump as defined in claim 1, wherein each of said first and second driving means includes a hydraulic motor powered by a variable displacement hydraulic pump.

14. A stuffing pump for handling a food product comprising a helical gear metering pump having inlet passage means and outlet passage means, first means for driving said metering pump at variable speed, vacuum means connected to the metering pump to remove air from the food product, an elongated hopper above the metering pump for receiving food, a feed conveyer in the bottom of the hopper feeding food product to the inlet passage means of the metering pump at a rate faster than the intake capacity of said metering pump, and second means for driving said conveyer at variable speed.

* * * * *